(12) United States Patent
Bode

(10) Patent No.: US 11,669,641 B2
(45) Date of Patent: Jun. 6, 2023

(54) METHOD FOR THE COMPUTER-AIDED PARAMETERIZATION OF A TECHNICAL SYSTEM

(71) Applicant: Sebastian Bode, Ahlen (DE)

(72) Inventor: Sebastian Bode, Ahlen (DE)

(73) Assignee: Siemens Aktiengesellschaft, Munich (DE)

(*) Notice: Subject to any disclaimer, the term of this patent is extended or adjusted under 35 U.S.C. 154(b) by 116 days.

(21) Appl. No.: 16/970,732

(22) PCT Filed: Feb. 14, 2019

(86) PCT No.: PCT/EP2019/053616
§ 371 (c)(1),
(2) Date: Aug. 18, 2020

(87) PCT Pub. No.: WO2019/162171
PCT Pub. Date: Aug. 29, 2019

(65) Prior Publication Data
US 2021/0012033 A1 Jan. 14, 2021

(30) Foreign Application Priority Data
Feb. 21, 2018 (DE) .................. 10 2018 202 626.2

(51) Int. Cl.
*G06F 21/64* (2013.01)
*G06F 8/61* (2018.01)
(Continued)

(52) U.S. Cl.
CPC ............... *G06F 21/64* (2013.01); *G06F 8/61* (2013.01); *G06F 21/629* (2013.01); *H04L 9/3247* (2013.01); *H04L 67/12* (2013.01)

(58) Field of Classification Search
CPC .......... G06F 21/64; G06F 8/61; G06F 21/629; G06F 8/65; G06F 21/71; H04L 9/3247; H04L 67/12; Y04S 40/18; Y04S 40/20
See application file for complete search history.

(56) References Cited

U.S. PATENT DOCUMENTS 8,839,234 B1  9/2014 Voronkov
9,239,247 B1* 1/2016 Angus .................... G06Q 10/20
(Continued)

FOREIGN PATENT DOCUMENTS

CN  1643878 A  7/2005
CN  101375542 A  2/2009
(Continued)

OTHER PUBLICATIONS

PCT International Search Report and Written Opinion of International Searching Authority dated May 22, 2019 corresponding to PCT International Application No. PCT/EP2019/053616 filed Feb. 14, 2019.

*Primary Examiner* — Mohammed Waliullah
(74) *Attorney, Agent, or Firm* — Lempia Summerfield Katz LLC

(57) ABSTRACT

The invention relates to a method for the computer-aided parameterisation of a technical system (1) in which the technical system (1) is used to store a software package (SP) that is signed with a first digital signature (SIG1) and comprises a test program (PM). The technical system (1) checks the validity of the first digital signature (SIG1). If the first digital signature (SIG1) is valid, the software package (SP) is installed on the technical system (1), wherein during the installation the test program (PM) checks whether a number of rules (RU), at least some of which are stored in the test program (PM), are observed by external digital information (DA) coming from outside the software package (SP). If there is a number of conditions (CO) comprising (Continued)

observance of the number of rules (RU) by the external digital information (DA), parameter setting is performed in the technical system (1) by means of the external digital information (DA) and otherwise the method is terminated.

18 Claims, 1 Drawing Sheet

(51) Int. Cl.
    *G06F 21/62*     (2013.01)
    *H04L 9/32*     (2006.01)
    *H04L 67/12*     (2022.01)

(56) References Cited

U.S. PATENT DOCUMENTS

| | | | |
|---|---|---|---|
| 9,276,752 B2* | 3/2016 | Abraham | H04L 9/3247 |
| 9,603,171 B2* | 3/2017 | Luft | H04W 76/10 |
| 2004/0127196 A1 | 7/2004 | Dabbish et al. | |
| 2005/0111467 A1 | 5/2005 | Ng et al. | |
| 2005/0256614 A1* | 11/2005 | Habermas | B60L 3/0023 701/1 |
| 2013/0318357 A1* | 11/2013 | Abraham | H04L 9/32 713/168 |
| 2014/0282353 A1 | 9/2014 | Jubran et al. | |
| 2014/0359605 A1 | 12/2014 | Leet et al. | |
| 2015/0134970 A1* | 5/2015 | Jang | H04L 9/3247 713/176 |
| 2016/0378990 A1 | 12/2016 | Goodman | |
| 2017/0019399 A1* | 1/2017 | Yamazaki | H04L 63/0853 |
| 2017/0293484 A1* | 10/2017 | Haase | G06F 8/658 |

FOREIGN PATENT DOCUMENTS

| | | |
|---|---|---|
| CN | 105144092 A | 12/2015 |
| CN | 105378740 A | 3/2016 |
| EP | 3101535 A1 | 12/2016 |

\* cited by examiner

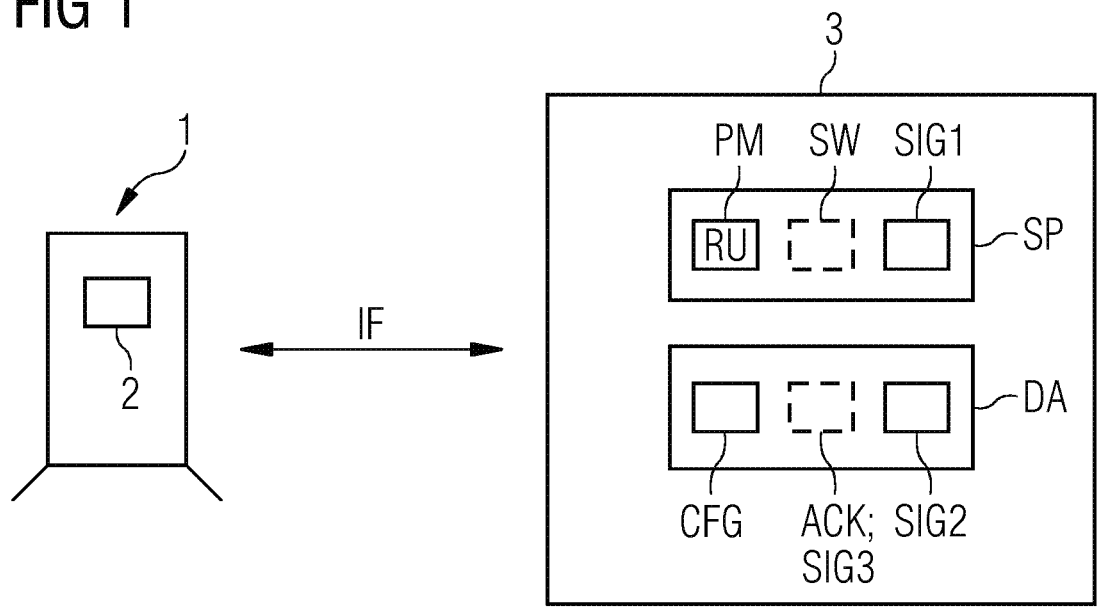
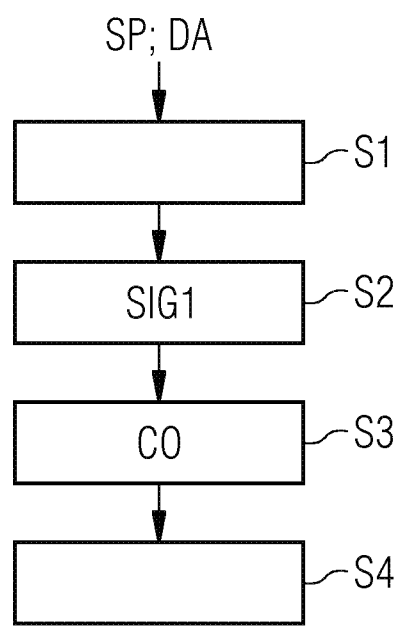

METHOD FOR THE COMPUTER-AIDED PARAMETERIZATION OF A TECHNICAL SYSTEM

CROSS REFERENCE TO RELATED APPLICATIONS

This present patent document is a § 371 nationalization of PCT Application Serial Number PCT/EP2019/053616 filed Feb. 14, 2019, designating the United States, which is hereby incorporated in its entirety by reference. This patent document also claims the benefit of DE 102018202626.2 file Feb. 21, 2018 which is hereby incorporated in its entirety by reference.

FIELD

Embodiments relate to a method for the computer-aided parameterization of a technical system.

BACKGROUND

There is often the need in a technical system to change or to reset certain parameters. There are parameters that relate to basic settings of the technical system and that are usually predefined identically, centrally, and for a number of technical systems. However, it is often also necessary to set parameters individually for a technical system, where the corresponding parameter values or their limits should however be predefined centrally.

To prevent unauthorized changing of parameters in a technical system, various solutions are known from the prior art. There may be proprietary interfaces that are implemented beforehand and on which authorized individuals have to authorize themselves to be able to make changes to a predetermined set of parameters. This solution is complex and not flexible.

There are furthermore approaches according to which, to change parameters of a technical system, there is a mandatory requirement for an online connection that allows the intended change to be checked and confirmed. Such solutions may lead to delays when changing parameters and are sometimes difficult to implement, for example when the technical system is a ship, or for example, a submarine.

To limit the parameter change to certain authorities, a plurality of independent hardware components may be installed on a technical system, for each of which authorized access is defined separately. This solution is linked to a great deal of effort and additional costs.

BRIEF SUMMARY AND DESCRIPTION

The scope of the present invention is defined solely by the appended claims and is not affected to any degree by the statements within this summary. The present embodiments may obviate one or more of the drawbacks or limitations in the related art.

Embodiments provide a method for the computer-aided parameterization of a technical system in which a parameter setting is able to be performed in the technical system in a simple and flexible manner.

The method is used for the computer-aided parameterization of a technical system. The term parameterization is understood in the broad sense and may include any kind of change of digital information on the technical system. The term parameterization may also include the deletion of data or the initial storage of data on the technical system.

In the course of the method, a software package (for example in the form of a file) is stored on the technical system. The software package is signed with a first digital signature and includes a test program. The test program may be configured, for example, as a script. The term first digital signature is used to be able to make better reference to this signature. It is not necessary for further digital signatures to be used in the method in addition to the first digital signature. The first digital signature may belong to a trusted authority, for example, the manufacturer of the software package. In other words, the first digital signature has been generated using a certificate of a trusted authority. The term storing the software package on the technical system is understood such that the software package is stored on a corresponding computer of the technical system. By way of example, the software package may be stored in a control unit or a controller that is intended to control the operation of the technical system.

In the method, the validity of the first digital signature is checked by the technical system, for example, a corresponding computer of the technical system. The validity check of a digital signature refers to a verification test on the digital signature where the signature is classified as valid when the verification test is successful. The verification test may be performed using a public key that belongs to a private key with which the digital signature was created.

If the above check reveals that the first digital signature is valid, the software package is installed on the technical system (for example, a corresponding computer of the technical system). In the course of the installation, the test program checks whether a number of rules that are stored at least in part in the test program are complied with by external digital information that originates from outside the software package and for example, also from outside the technical system. The number of rules may in this case also take into account only some of the external digital information.

If a number of conditions, including the external digital information complying with the number of rules, are present, a parameter setting is performed in the technical system by way of the external digital information. Only some of the external digital information may also be incorporated in the parameter setting. If the number of conditions is not present, the method is terminated. The number of conditions may possibly only include complying with the number of rules, but other conditions in addition to complying with the number of rules may furthermore also be provided, the further conditions not being contained in the number of rules and being stored for example directly on the technical system.

The method has the advantage that a parameter setting is able to be performed easily in a technical system by installing a software package. In this case, as a result of changing the external digital information not belonging to the software package, the criteria for a permissible parameter setting are able to be adjusted in a flexible manner. The circle of people that is allowed to set certain parameters on the technical system may be changed in a flexible manner.

In an embodiment, the external digital information includes configuration data that influence the operation of the technical system. The configuration data may relate to any configuration parameters that play a role in the operation of the technical system, such as for example calibration values.

In an embodiment, the configuration data specify a respective parameter value for at least one configuration parameter of the technical system. The fact that the parameter value is permissible in the technical system is stored as a rule to be complied with in the number of rules. The permissibility may be specified through a permissible range of values. In other words, the corresponding rule is complied with when the value lies within the permissible range of values.

All of the rules of the number of rules may possibly be stored in the test program. In an embodiment, however, some of the rules of the number of rules are contained in the external digital information. The test program may contain one or more specifications by way of which that portion of the rules that is checked for compliance is selected from a set of rules in the external digital information.

In an embodiment, the software package and/or the external digital information are transferred from a portable data carrier to the technical system (for example, to a corresponding computer of the technical system) via a predefined communication interface. Depending on the refinement, the data transfer may take place in a contact-based or contactless manner. By way of example, the portable data carrier may be a USB stick that is carried by an engineer, who plugs the USB stick into the corresponding technical system, whereupon the software package or the external digital information is transferred from the USB stick to the technical system. A wireless interface such as for example Bluetooth or infrared may also be used to transfer the software package or the external digital information from the portable data carrier to the technical system. If both the software package and the external digital information are transferred from a portable data carrier to the technical system, the software package and the external digital information may be stored on the same portable data carrier. However, two different portable data carriers may also be used for the software package and the external digital information.

In an embodiment, the external digital information includes digital data that are signed with a second digital signature, that is a signature different from the first signature. The second digital signature may belong to a trusted authority that is authorized to change certain parameters on the technical system. The second digital signature may have been created using a certificate of this trusted authority. By way of example, the second signature may belong to an engineer that is intended to perform a corresponding parameter setting on a technical system using the software package and the external digital information that is stored for example on a portable data carrier carried by the engineer.

In an embodiment, the number of conditions that have to be present to perform the parameter setting contains the condition whereby the technical system has a permissible identification and/or a permissible state and/or whereby the current time of the installation of the software package is within a permissible time window and/or whereby the technical system has a permissible state following installation of the software package and/or whereby the external digital information is assigned to at least two different people. The assignment of the external digital information to two or more different people may be checked for example by testing corresponding signatures. The last condition is able to achieve a situation whereby a parameter change is able to be performed only jointly by a plurality of people. The above term state of the technical system may refer to any states of the technical system that may occur during operation thereof. The conditions may constitute corresponding rules of the number of rules or may however also be additional conditions that are independent of the rules of the test program.

In an embodiment, the parameter setting on the technical system includes deleting predetermined data on the technical system. The number of rules includes the rule to be complied with whereby the external digital information includes a confirmation of receipt of the data to be deleted at a predefined authority. By way of example, the data to be deleted may be measurement data that are used in the context of billing and for which it has to be ensured that the data are not deleted before they have been transmitted for example to a corresponding billing authority or an external archiving memory.

In an embodiment, the confirmation of receipt is signed with a digital signature of the predefined authority and the number of rules includes the rule to be complied with whereby the digital signature of the third authority is valid. As a result, it is ensured that the data to be deleted have also been transmitted beforehand to the desired third authority.

In an embodiment, the software package contains, in addition to the test program, further software that is installed when the number of conditions is present in the course of the installation of the software package on the technical system. The installation of further software on the technical system is thereby also able to be linked to certain rules.

The technical system that is parameterized using the method may be any technical device or any technical installation or any technical unit. A technical system may for example include a charging column, for example, for charging electric vehicles. The technical system may likewise include a traffic signal installation (for example a stop light) or an electrical energy generation installation or a control system for an industrial automation installation. The energy generation installation may, for example, be a renewable energy generation installation, such as for example a wind turbine or a photovoltaic installation.

In addition to the method described above, embodiments include a computer program product containing a program code stored on a machine-readable carrier for performing the method or one or more embodiments of the method when the program code is executed on a computer. The program code thus includes the software package used in the method.

Embodiments include a computer program containing a program code for performing the method or one or more embodiments of the method. In the same way as the computer program product, the program code of the computer program also includes the software package used in the method.

BRIEF DESCRIPTION OF THE FIGURES

FIG. 1 depicts a schematic illustration of ay scenario in which one variant of the method is used according to an embodiment.

FIG. 2 depicts a flowchart for the sequence of an embodiment of the method.

DETAILED DESCRIPTION

The method is described below on the basis of the parameterization of a technical system in the form of a charging column for electrically charging electric vehicles, where the charging column in FIG. 1 is depicted schematically and is provided with the reference sign 1. The method described below may also be used to parameterize any other technical system.

The charging column 1 contains a controller 2 that stores digital data relating to the operation of the charging column. The controller takes the data into consideration during the operation of the technical system. The aim of the method described below is to manipulate the digital data. The manipulation is initiated by an authorized engineer that carries a portable data carrier 3, for example in the form of a USB stick. The portable data carrier contains a software package SP, that in turn includes a test program PM, that is also referred to hereinafter as a test module and is configured for example as a script. The software package SP may for example be present in the form of a file and is signed with a first digital signature SIG1. The signature has been created using a certificate of a trusted authority, for example a certificate of the manufacturer of the software package. In an embodiment, the software package SP contains only the test module PM as software. Further software SW may also possibly additionally be contained in the software package SP, this being indicated by a dashed rectangle in FIG. 1.

The test module PM stores a predetermined number of rules (for example, at least one rule) RU that define the way and the conditions in which a parameter setting should be performed in the controller 2 of the charging column 1. The number of rules RU in this case takes into account external digital information that is not part of the software package SP. The external digital information is digital data DA in the embodiment of FIG. 1. The digital data are also stored on the portable data carrier 3. The digital data, that may be present for example in the form of a file, are signed with a second digital signature SIG2 by way of which parameter setting authorization is defined. In an embodiment, the second digital signature has been created by a certificate of the engineer that carries the portable data carrier 3.

The digital data DA contain, in an embodiment, configuration data CFG that relates to one or more operating parameters of the charging column 1. The digital data DA may also contain, in addition to the configuration data, a confirmation of receipt ACK, as indicated by a dashed rectangle in FIG. 1. The confirmation of receipt is signed with a signature SIG3 based on a certificate of a third authority. The confirmation of receipt is required for example when measurement data at the charging column 1 are intended to be deleted in the course of the parameter setting, as is described in more detail further below.

In an embodiment, the configuration data CFG contains attenuation values that need to be stored in the charging column 1 to calibrate the level of a PLC (power line communication) connection. The PLC connection is set up in the course of charging an electric vehicle between the charging column and the electric vehicle via the charging cable.

To parameterize the charging column 1 based on the configuration data CFG from the portable data carrier 3, the engineer connects the portable data carrier 3 to the charging column via an interface IF (indicated by a double-headed arrow). If the portable data carrier is a USB stick, the engineer plugs the USB stick into a corresponding input of the charging column. The method steps are then performed as depicted in the flowchart of FIG. 2 and being described in more detail below.

In step S1, the software package SP and the digital data DA are transferred to the controller 2 of the charging column 1. In a step S2, the first signature SIG1 is checked with regard to its validity by the controller 2, for example, a verification test is performed on the signature. Only if the signature SIG1 is recognized as valid is there a transition to step S3. Otherwise, the method is terminated, and a corresponding notification is possibly output via a user interface on the technical system.

In step S3, the software package SP is installed on the controller 2 of the charging column 1. In the course of this installation, the test module PM is executed and checks whether a number of conditions CO is present or is met. The number of conditions contains compliance with the number of rules RU that are stored in the test module PM. The rules to be complied with include the criterion whereby the values of respective configuration parameters from the configuration data CFG (for example the abovementioned attenuation values) lie within predetermined plausibility limits. Only if this is the case is the corresponding rule complied with. A further rule to be complied with in the exemplary embodiment described here is that the signature SIG2 with which the digital data DA are signed is valid.

A further rule to be complied with may relate to the confirmation of receipt ACK already mentioned above. The confirmation of receipt is contained in the digital data DA only when the third authority to which the signature SIG3 belongs has confirmed the receipt of data that are to be deleted in the course of the parameter setting on the controller 2. The data to be deleted relates for example to measurement data that arise in connection with billing. The measurement data may include the power drawn from the charging column within a particular time interval. In an embodiment, the rules to be complied with contain the rule whereby a confirmation of receipt ACK is contained in the data DA and the signature SIG3 with which the confirmation of receipt ACK is signed is also valid. Accordingly, in step S3, both the presence of the confirmation of receipt ACK and the validity of the signature SIG3 are checked.

In an embodiment, the conditions CO relate exclusively to compliance with the rules stored in the test module PM. The conditions CO may possibly however contain further conditions, the presence of which is checked in step S3, and that are not linked to the rules RU.

At the end of step S3, it is established whether all of the rules RU are complied with or all of the conditions CO are present. If this is not the case, the method is terminated and a notification is again possibly output via a user interface on the charging column. If, however all of the rules RU are complied with or all of the conditions CO are met, there is a transition to step S4. In step S4, the parameter setting is performed in the charging column 1, taking into account the data DA. In an embodiment, corresponding values of configuration parameters are adopted from the configuration data CFG by the controller 2 to control the charging column 1. If the data DA also contains the confirmation of receipt ACK with a valid signature SIG3, the data that are specified in the confirmation of receipt ACK are also deleted. The deleted data may then be overwritten with new values and the new values are contained in the data DA.

The above-described embodiments include a number of advantages. It is possible to parameterize a technical system through the installation of a software package in a simple and flexible manner. In this case, rules in the software package and other external digital information may be used to flexibly define which authorities are allowed to manipulate which parameters in what way.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for computer-aided parameterization of a technical system, wherein a software package is stored on the technical system, wherein the software package is signed with a first digital signature and comprises a test program, the method comprising:
   checking the validity of the first digital signature by the technical system;
   installing, after determining the first digital signature is valid, the software package on the technical system;
   checking, by the test program during installation, whether a number of rules that are stored at least in part in the test program are complied with by external digital information that originates from outside the software package, wherein the number of rules comprises at least a rule to be complied with whereby the external digital information comprises a confirmation of receipt of the data to be deleted at a predefined authority; and
   performing, after determining that a number of conditions comprising the external digital information that comply with the number of rules are present, a parameter setting in the technical system using the external digital information, wherein the parameter setting in the technical system comprises deleting predetermined data on the technical system.

2. The method of claim 1, wherein the external digital information comprises configuration data that influence the operation of the technical system.

3. The method of claim 2, wherein the configuration data specify a respective parameter value for at least one configuration parameter of the technical system and wherein a rule that the respective parameter value is permissible in the technical system is stored as a rule to be complied with in the number of rules.

4. The method of claim 1, wherein one or more of the rules from the number of rules are contained in the external digital information.

5. The method of claim 4, wherein the test program contains one or more specifications, wherein a portion of the rules that is checked for compliance is selected from a set of rules in the external digital information.

6. The method of claim 1, wherein the software package, the external digital information, or the software package and the external digital information is transferred from a portable data carrier to the technical system via a predefined communication interface.

7. The method of claim 1, wherein the external digital information comprises digital data that are signed with a second digital signature, wherein the number of rules comprises at least a rule to be complied with whereby the second digital signature is valid.

8. The method of claim 1, wherein the number of conditions comprises at least a condition including at least one of wherein the technical system includes at least one of a permissible identification, a permissible state, or a permissible identification and permissible state, wherein a current time of the installation of the software package is within a permissible time window, wherein the technical system includes a permissible state following installation of the software package, or wherein the external digital information is assigned to at least two different people.

9. The method of claim 1, wherein the confirmation of receipt is signed with a digital signature of the predefined authority and the number of rules comprises at least a rule to be complied with whereby the digital signature of the predefined authority is valid.

10. The method of claim 1, wherein the software package contains, in addition to the test program, further software that is installed when the number of conditions are present in the installation of the software package on the technical system.

11. The method of claim 1, wherein the technical system comprises one of a charging column for charging electric vehicles, a traffic signal installation, an electrical energy generation installation, or a control system for an industrial automation installation.

12. A non-transitory computer implemented storage medium that stores machine-readable instructions executable by at least one processor for computer-aided parameterization of a technical system, wherein a software package is stored on the technical system, wherein the software package is signed with a first digital signature and comprises a test program, the machine-readable instructions comprising:
   checking the validity of the first digital signature by the technical system;
   installing, after determining the first digital signature is valid, the software package on the technical system;
   checking, in the course of the installation by the test program, whether a number of rules that are stored at least in part in the test program are complied with by external digital information that originates from outside the software package, wherein the number of rules comprises the rule to be complied with whereby the external digital information comprises a confirmation of receipt of the data to be deleted at a predefined authority; and
   performing, after determining that a number of conditions comprising the external digital information that comply with the number of rules are present, a parameter setting in the technical system using the external digital information, wherein the parameter setting in the technical system comprises deleting predetermined data on the technical system.

13. The non-transitory computer implemented storage medium of claim 12, wherein the external digital information comprises configuration data that influence the operation of the technical system.

14. The non-transitory computer implemented storage medium of claim 13, wherein the configuration data specify a respective parameter value for at least one configuration parameter of the technical system and wherein a rule that the respective parameter value is permissible in the technical system is stored as a rule to be complied with in the number of rules.

15. The non-transitory computer implemented storage medium of claim 12, wherein one or more of the rules from the number of rules are contained in the external digital information.

16. The non-transitory computer implemented storage medium of claim 15, wherein the test program contains one or more specifications, wherein a portion of the rules that is checked for compliance is selected from a set of rules in the external digital information.

17. The non-transitory computer implemented storage medium of claim 12, wherein the software package, the external digital information, or the software package and the external digital information is transferred from a portable data carrier to the technical system via a predefined communication interface.

18. The non-transitory computer implemented storage medium of claim 12, wherein the confirmation of receipt is signed with a digital signature of the predefined authority and the number of rules comprises at least a rule to be complied with whereby the digital signature of the predefined authority is valid.

* * * * *